United States Patent Office 3,485,886
Patented Dec. 23, 1969

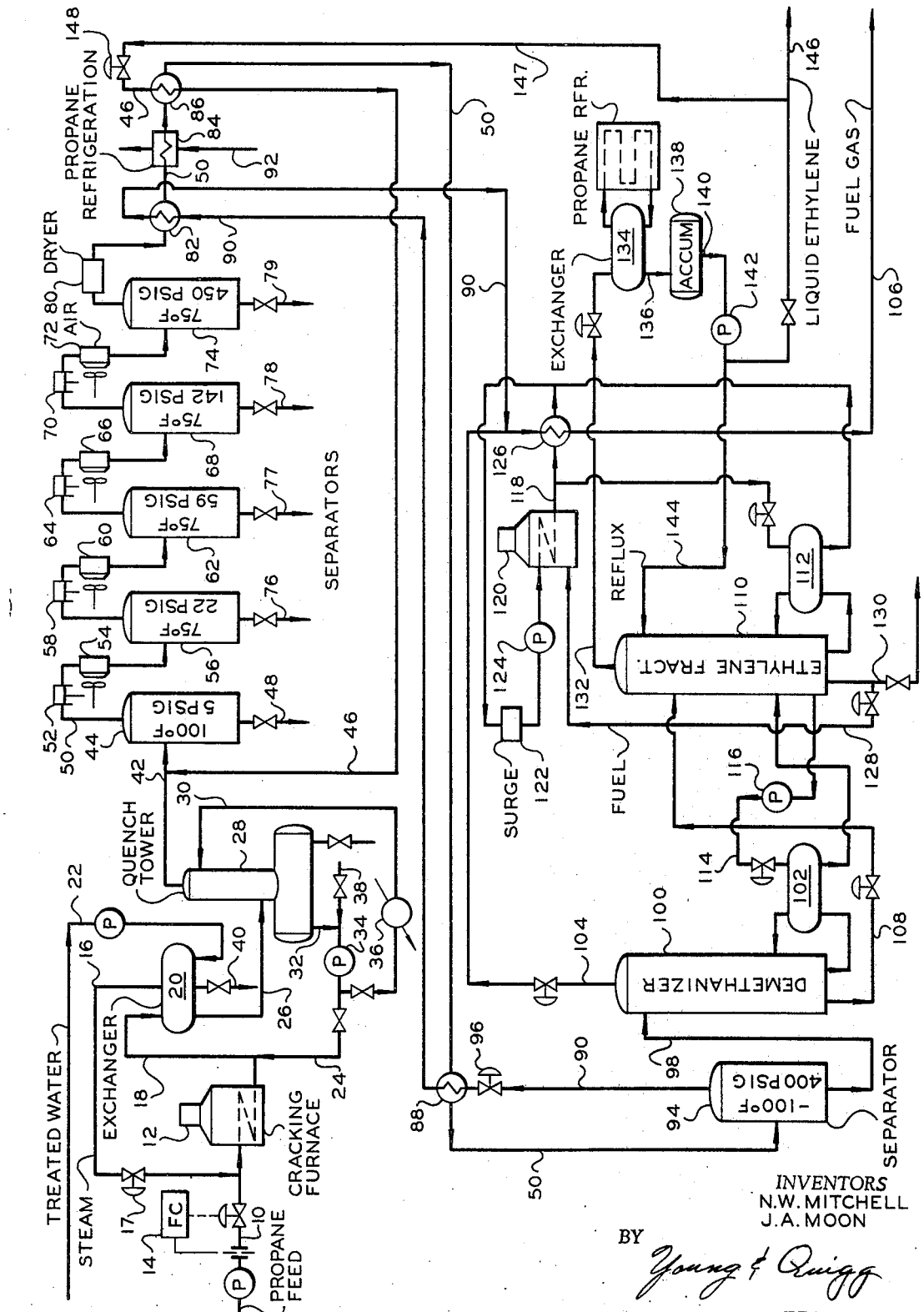

3,485,886
PRODUCTION OF HIGH PURITY ETHYLENE
Norris W. Mitchell, Borger, Tex., and John A. Moon, Bartlesville, Okla., assignors to Phillips Petroleum Company, a corporation of Delaware
Filed May 5, 1967, Ser. No. 636,421
Int. Cl. C07c 7/02, 3/30, 11/04
U.S. Cl. 260—677      8 Claims

ABSTRACT OF THE DISCLOSURE

High purity ethylene is produced from propane by the steps of (a) thermocracking; (b) two-stage water quenching of the cracked gases; (c) multi-stage compression and partial condensation for removal of heavy impurities; (d) demethanation and deethanation of the resulting stream and recycling a portion of the flashed, chilled ethylene product into the water-quenched cracked gases to partially condense the same.

---

This invention relates to a process for producing high purity ethylene from a high pressure, high temperature stream of mixed hydrocarbon gases ranging from methane to C5 and heavier hydrocarbons.

Ethylene is a valuable hydrocarbon which is readily producible from other hydrocarbons such as propane by catalytic or thermal cracking. Ethylene functions exceptionally well as a refrigerant but this application of the hydrocarbon demands exceptionally high purity. However, because it is difficult to liquefy ethylene and separate it by distillation, and because ethylene is not very reactive chemically under readily obtained conditions, the recovery of ethylene in high purity has been one of the major obstacles preventing its use on a large scale. This invention is concerned with a process for producing ethylene of a purity of at least 98 percent and up to 99 percent.

Accordingly, it is an object of the invention to produce ethylene of high purity. Another object is to provide a process for producing ethylene of high purity from propane by thermocracking and recovery of ethylene from the resulting cracked gases. A further object is to provide a process for separating ethylene in high purity from mixtures of ethylene with other hydrocarbons boiling both above and below the boiling point of ethylene such as C1 to C5 and heavier hydrocarbons. Other objects of the invention will become apparent to one skilled in the art upon consideration of the accompanying disclosure.

One embodiment of the invention as applied to a high temperature, high pressure hydrocarbon stream containing a relatively high concentration of ethylene and hydrocarbons ranging from C1 to C5 and heavier, comprises water quenching the ethylene-rich hot stream to reduce the temperature thereof to the range of 250–325° F., injecting into the quenched stream a cold stream of expanded ethylene product from the process so as to further cool the quenched gas stream and knock out most of the water and C5 and heavier hydrocarbons, compressing and cooling the resulting gas stream in successive stages to approximately atmospheric temperature and a pressure in the range of about 400–500 p.s.i.g., separating from the cooled and compressed stream any resulting water and C5 and heavier hydrocarbons following each stage, contacting the resulting compressed and cooled stream with a desiccant to remove remaining water vapor, cooling the dried gas stream by indirect heat exchange with refrigerant to liquefy at least the ethylene and components heavier than ethylene therein, demethanizing the resulting liquid stream to recover substantially all of the methane therefrom as an overhead stream and a bottom stream of ethylene and heavier hydrocarbons, and fractionating the bottom streams to recover a substantially pure ethylene product stream overhead and a bottom stream of hydrocarbons heavier than ethylene.

In accordance with another embodiment of the invention, before passing the cold liquefied stream to demethanation, the stream is passed into a separation chamber or tower to remove an overhead vapor stream of principally methane thru an expansion zone to provide a refrigerant stream and a bottom stream of principally ethylene but also containing a substantial concentration of methane. This bottom stream is then fed to the demethanizer to produce an ethylene bottom stream substantially free of methane. The overhead refrigerant stream from the separation chamber after passing thru an expansion valve is brought into indirect heat exchange with the feed to the separation chamber just upstream thereof and the effluent refrigerant is again brought into indirect heat exchange with the compressed and cooled gas stream just downstream of the drying step. The latter heat exchange step is followed by a propane refrigeration step and then by a step of indirect heat exchange with the flashed ethylene stream before passing this ethylene stream into the gas stream just downstream of the water quench.

In another embodiment of the invention, heat for the reboiler of the demethanizer is provided by circulating a portion of the kettle material in the ethylene fractionator thru the reboiler on the demethanizer and returning the cooled kettle product to the ethylene fractionator kettle. Heat for the reboiler on the ethylene fractionator is provided by maintaining a closed loop of light oil such as kerosene circulating thru the reboiler and thru a heater. Fuel for the heater is supplied by burning a stream of kettle product from the ethylene fractionator.

A more complete understanding of the invention may be had by reference to the accompanying schematic drawing which is a flow sheet illustrating an arrangement of apparatus and flow for effecting the process of the invention.

Referring to the drawing, a hydrocarbon feed line 10 leads into a cracking furnace 12 to which the flow of hydrocarbon feed is controlled by flow controller 14. A steam feed line 16 connects with feed line 10 for introducing steam to the cracking furnace. Furnace effluent line 18 connects with an indirect heat exchanger 20 thru which water is passed from line 22 to steam line 16. A water-quench line 24 connects with line 18 to provide water quenching of the hot cracked effluent. Line 26 leads from heat exchanger 20 directly into a direct water-quench tower 28. Quench-water line 30 connects with the upper end of tower 28 and withdrawal line 32 connects with the outlet at the bottom of the tower and with line 30 thru pump 34 and also with line 24 for injecting water into effluent line 18. An air cooler 36 in line 30 is provided to maintain desired quench-water temperature for tower 28. Water supply line 38 connects with line 32 to furnish makeup water for the process. Line 40 provides for periodic blowdown of exchanger 20.

Line 42 connects the overhead outlet of quench tower 28 with separator 44. Line 46 connects with line 42 for injecting ethylene refrigerant directly into line 42. Line 48 connects with the bottom outlet of separator 44 for withdrawing condensed water and C5+ hydrocarbons.

Line 50, connecting with the top of separator 44 and carrying the quenched and cooled hydrocarbon gas stream, passes successively thru four stages of compression, cooling, and separation. The first stage comprises compressor 52, air-fin cooler 54, and separator 56, the second stage comprises compressor 58, air-fin cooler 60, and separator 62, the third stage comprises compressor 64, air-fin cooler 66, and separator 68, and the fourth stage comprises compressor 70, air-fin cooler 72, and separator 74. The separators 56, 62, 68, and 74 in the four stages are provided with withdrawal lines 76, 77, 78, and 79, respectively, for withdrawing condensate including water and pentanes and heavier.

A drying vessel 80, preferably containing a Linde molecular sieve 5A desiccant, is positioned in gas line 50 downstream of separator 74 for removing remaining water vapor from the hydrocarbon gas stream. Gas line 50 downstream of dryer 80 passes thru four stages of refrigeration provided by indirect heat exchangers 82, 84, 86, and 88. Refrigerant comprising principally methane as hereinafter described is circulated thru heat exchanger 82 by means of line 90. Heat exchanger 84 is provided with propane refrigerant from line 92 connected with conventional propane refrigeration elements not shown. Ethylene refrigerant, as hereinafter described, is circulated thru exchanger 86 by means of line 46. In the final stage of refrigeration in exchanger 88 refrigerant comprising principally methane is circulated thru line 90 as an overhead stream from separator 94 taken off thru expansion valve 96.

Substantially all of the hydrocarbons in line 50 downstream of heat exchanger 88 are in liquid form, the vapor stream taken off thru line 90 from separator 94 being principally methane. Line 98 connects the bottom outlet of separator 94 with an upper section of demethanizer 100 which is a conventional demethanizer provided with a reboiler 102 connected with the kettle section of the column. Demethanizer overhead line 104, carrying principally methane, connects with line 90 downstream of exchanger 82 and both lines lead into fuel gas product line 106. Line 108 connects the kettle product outlet of demethanizer 100 with the inlet of ethylene fractionator 110, providing the feed comprising principally ethylene to this fractionator.

Fractionator 110 is a conventional ethylene fractionation column and is operated as such, being provided with a reboiler 112 which is connected with the kettle section of the colum for circulation of reboiler liquid. A circulation line 114 provided with pump 116 connects with the kettle section of column 110 and passes thru heat exchange tubes in reboiler 102 and back to the kettle section of column 110. Thus, circulation of kettle material from column 100 thru reboiler 102 provides the heat in the kettle section of column 110 for the demethanation step.

Heat for reboiler 112 is supplied by circulating kerosene or other light hydrocarbon oil thru a closed loop 118 passing thru reboiler 112 and thru a heater or furnace 120. Included in loop 118 are a surge tank 122, a pump 124, and an indirect heat exchanger 126 positioned in line 106. Fuel for furnace 120 is supplied by line 128 connecting with the kettle section of fractionator 110. Any portion of the ethylene fractionator bottom, comprising principally ethane, propylene, propane, and n-butane, not used as fuel in heater 120 is removed thru line 130.

An ethylene stream of about 99 weight percent purity is withdrawn from fractionator 110 as overhead thru line 132 and passed to propane refrigeration unit 134 which is a conventional unit. Line 136 connects the outlet from unit 134 with the accumulator 138 for liquid ethylene. Line 140 containing pump 142 feeds liquid ethylene to reflux line 144, to product takeoff line 146 and to refrigerant line 46. An expansion valve 148 in ethylene line 46 provides for flashing ethylene for refrigerant in line 46 passing thru heat exchanger 86 and also into the water-quenched gas stream in line 42.

In a preferred embodiment of the invention (in which all values given are approximate), a propane feed is introduced in admixture with steam from lines 10 and 16, respectively, into cracking furnace 12 where the propane is cracked to produce hydrogen, methane, acetylene, ethylene, ethane, and hydrocarbons up to pentane and some heaviers. Water from line 24 is injected into the gaseous stream in line 18 at a temperature of about 165° F. and at the rate of 925 pounds per hour. The resulting stream is introduced at a temperature of about 773° F. into indirect heat exchanger 20 thru which water is circulated at the rate of 431 pounds per hour from line 22 to produce about 391 pounds per hour of steam for delivery thru line 16 and expansion valve 17 into the propane feed line. The vapor leaving heat exchanger 20 thru line 26 is at a temperature of about 500° F. and a pressure of about 17 p.s.i.g. This vapor stream passing into quench tower 28 is further reduced in temperature to about 300° F. and to a pressure of about 5 p.s.i.g. This direct quenching is effected by the introduction to the top of the tower of about 32,400 pounds of water per hour at about 93° F. To complete the quenching of the gas stream in line 42, 970 pounds per hour of ethylene vapor at about $-35°$ F. is injected into this stream. This injection of ethylene reduces the temperature of the resulting stream to about 100° F. and the pressure to 5 p.s.i.g. Pentanes and heavier hydrocarbons are withdrawn from separator 44 thru line 48 at the rate of about 2 pounds per hour along with water condensate.

In the first stage of compression and cooling in line 50 downstream of separator 44, the pressure is increased from 5 p.s.i.g. to 22 p.s.i.g. and the temperature is reduced to 75° F. Pentanes and heavier at the rate of 1 pound per hour, along with water condensate, are withdrawn from separator 56 thru line 76. In the second stage of compression and cooling in line 50 downstream of separator 56, the pressure is increased to 59 p.s.i.g. at a temperature of 75° F. About .6 pound per hour of pentanes and heavier along with water condensate are withdrawn thru line 77.

In the third stage of compression and cooling, in line 50 downstream of separator 62, the pressure is increased to 142 p.s.i.g. and the temperature is maintained at about 75° F. Here again, pentanes and heavier are withdrawn at the rate of 0.3 pound per hour along with water condensate thru line 78. In the fourth stage of compression and cooling, downstream of separator 68, the pressure is increased to 450 p.s.i.g. while the temperature is maintained at about 75° F. The withdrawal of C5 and heavier hydrocarbons thru line 79 along with water condensate is at the rate of 0.1 pound per hour.

The compressed gas stream in line 50 downstream of separator 74 is passed thru dryer 80, containing Linde molecular sieve 5A desiccant, to substantially completely dry the compressed gas. This dry gas at a pressure of 435 p.s.i.g. and a temperature of 75° F. is cooled to about 53° F. at a pressure of 420 p.s.i.g. in heat exchanger 82 to which expanded methane at a temperature of $-103°$ F. enters from line 90. This increases the refrigerant to about 40° F. The resulting stream is further cooled to $-25°$ F. in propane refrigeration unit 84 and the gas is now at a pressure of 415 p.s.i.g. After this gas passes thru heat exchanger 86 in indirect heat exchange with expanded ethylene at a temperature of $-134°$ F., it is at a pressure of 407 p.s.i.g. and a temperature of $-98°$ F. Heat exchange in exchanger 86 increases the temperature of the ethylene refrigerant to $-35°$ F. which is the temperature at which the ethylene vapor is introduced to line 42 as the final quench.

The hydrocarbon gas stream is further refrigerated in heat exchanger 88 to a temperature of $-100°$ F. and the pressure is now at 400 p.s.i.g. as the liquid stream enters separator 94. Expansion valve 96 allows the pressure of the methane stream in line 90 to be reduced to about 50 p.s.i.g. and the temperature is $-120°$ F. as it enters exchanger 88 where it is heated to a $-103°$ F. and the pressure is now 43 p.s.i.g. This is the gas that is passed thru line 90 and heat exchanger 82 in the first stage of refrigeration.

The liquid ethylene in line 98 is demethanized in column 100 at a pressure of 390 p.s.i.g. using a kettle temperature of about 25° F. and an overhead temperature of $-77°$ F. The ethylene stream in line 108 at a temperature of about 25° F. is passed into ethylene fractionator 110 in which the kettle temperature is maintained at about 99° F. with an overhead temperature of −18° F., the pressure in column 110 being maintained at about 280 p.s.i.g. The kettle temperature of 99° F. is maintained by heating a stream of circulated kettle material thru reboiler 112 in indirect heat exchange with a kerosene stream heated in heater 120 to a temperature of 199° F. and 50 p.s.i.g., circulating at the rate of about 20,000 pounds per hour thru closed loop 118.

The ethylene stream of about 99 percent purity in line 132 at a temperature of −18° F. is further cooled in propane refrigeration unit 134 to −20° F. which temperature it passes into accumulator 138 and is recovered as product in line 146. A portion of this stream is passed thru line 147 and expansion valve 148 into line 46, where it is reduced in pressure to about 10 p.s.i.g. at a temperature of −134° F. for use as refrigerant in heat exchanger 86 and in line 42.

The composition of the various streams and temperatures and pressures thereof are set forth in the following table:

TABLE I.—POUNDS/HOUR

| Stream | 10 Liquid propane feed | 18 Cracked gas | 26 Gas to quench tower | 147 Liquid recycle ethylene | 50 Compressor inlet | 90 Separator overhead | 98 Methane stripper feed | 104 Methane stripper overhead | 108 Methane stripper bottoms | 128 Ethylene fractionator bottoms | 132 Ethylene fractionator overhead | 106 Gas to fuel | 146 Ethylene product |
|---|---|---|---|---|---|---|---|---|---|---|---|---|---|
| Hydrogen | | 24 | 24 | | 24 | 22 | 2 | 2 | | | | 24 | |
| Methane | | 403 | 403 | 402 | 405 | 145 | 260 | 257 | 3 | | 3 | 402 | 1 |
| Acetylenes | | 5 | 5 | 0 | 5 | 3 | 2 | 2 | | | | 5 | |
| Ethylene | | 614 | 614 | 950 | 1,564 | 90 | 1,474 | 131 | 1,343 | 13 | 1,330 | 221 | 380 |
| Ethane | | 139 | 139 | 18 | 157 | 6 | 151 | 12 | 139 | 117 | 22 | 18 | 4 |
| Methyl acetylene | | 5 | 5 | | 5 | | 5 | 5 | | | | 5 | |
| Propylene | | 204 | 204 | | 204 | 1 | 203 | 3 | 200 | 200 | | 4 | |
| Propane | 1,760 | 175 | 175 | | 175 | 1 | 174 | 2 | 172 | 172 | | 3 | |
| Ethyl acetylene | | 19 | 19 | | 19 | | 19 | | 19 | 19 | | | |
| Butene-1 | | 14 | 14 | | 14 | | 14 | | 14 | 14 | | | |
| Normal butane | | 3 | 3 | | 3 | | 3 | | 3 | 3 | | | |
| Pentane plus | | 155 | 155 | | 153 | | 150 | | 150 | 150 | | | |
| Steam or water | 391 | 391 | 2,111 | | | | | | | | | | |
| Total | 2,151 | 2,151 | 3,871 | 970 | 2,728 | 268 | 2,457 | 414 | 2,043 | 688 | 1,355 | 682 | 385 |
| Condition | Liquid | Vapor | Vapor | ² Liquid | Vapor | Vapor | Liquid | Vapor | Liquid | Liquid | Vapor | Vapor | Liquid |
| Temp., °F | 40 | 1,620 | 500 | ² −18 | 100 | −100 | −100 | −77 | 25 | 99 | −18 | 100 | −18 |
| Pres., p.s.i.g | 60 | 25 | 17 | ² 320 | 5 | 400 | 400 | 390 | 390 | 280 | 320 | 40 | 320 |

¹ Purity = about 99%.
² At tower ethylene is liquid, but after flash, is vapor.

The product ethylene at a purity of substantially 99 weight percent is an excellent refrigerant because of its purity. Obtaining ethylene of this high purity is the result of the cooperative steps of the invention and in particular, of the injection of a large amount of vaporous ethylene at low temperature into the gas stream in line 42. The amount of ethylene introduced in this manner is at least equal to the amount of ethylene in stream 42 and is sufficient to lower the temperature of the resulting stream to the range of 50–125° F., and preferably to the range of 90–110° F.

The foregoing illustrative details of the invention are not to be construed as unnecessarily limiting the invention. Reasonable variations in pressure, temperature, and other operating conditions are within the scope of the invention.

We claim:
1. A process for producing high purity ethylene from a hot stream of gas at elevated pressure comprising principally ethylene, lighter gases including methane and hydrogen, heavier gases including ethane and $C_3$ to $C_5$ and heavier hydrocarbons, which comprises the steps of:
   (1) water-quenching said hot stream to a temperature in the range of about 250 to 325° F.;
   (2) injecting into the quenched effluent gas stream from step (1) a cold stream of expanded ethylene product obtained from step (7) so as to further cool said gas stream and knock out most of the water and $C_5$ and heavier hydrocarbons;
   (3) compressing and cooling the effluent gas stream from step (2) in successive stages to approximately atmospheric temperature and a pressure in the range of 400 to 500 p.s.i.g., separating from said stream any resulting water and $C_5$ and heavier hydrocarbons following each stage;
   (4) contacting the effluent gas stream from step (3) with a desiccant to remove remaining water vapor;
   (5) cooling the gas stream from step (4) by indirect heat exchange with refrigerant to liquefy at least the ethylene and heavier components therein;
   (6) demethanizing the cold effluent stream from step (5) to recover substantially all of the methane therein as an overhead stream and a bottom stream of ethylene and heavier hydrocarbons; and
   (7) fractionating the bottom stream from step (6) to recover a substantially pure ethylene product stream overhead and a bottom stream of hydrocarbons heavier than ethylene.

2. The process of claim 1 including between steps (5) and (6) the step of:
   (8) passing the cooled effluent from step (5) into a separation chamber to remove an overhead vapor stream of principally methane thru an expansion zone to provide a refrigerant stream and a bottoms stream of principally ethylene as the feed to step (6).

3. The process of claim 2 wherein step (5) comprises:
   (a) first cooling the dry gas stream from step (4) with the refrigerant stream from step (8) after said refrigerant stream is warmed in (d);
   (b) further cooling said stream with propane refrigerant;
   (c) following (b), further cooling said stream with a portion of the ethylene product stream after expansion thereof and passing the resulting ethylene stream from this step to step (2) as said cold stream of ethylene; and
   (d) following (c), further cooling said stream with the expanded refrigerant stream from step (8) before passing same to (a).

4. The process of claim 1 including the steps of:
   (9) maintaining a closed light hydrocarbon oil loop circulating thru a heater and a reboiler for ethylene fractionation step (7);
   (10) burning at least a portion of the bottoms stream of step (7) in the heater of step (9) to supply reboiler heat; and
   (11) circulating a portion of the kettle fluid from the ethylene fractionation of step (7) as reboiler heating fluid for demethanizing step (6) and returning same to the ethylene fractionation kettle fluid.

5. The process of claim 4 using kerosene as said light oil.

6. The process of claim 1 wherein said hot stream of gas is produced by cracking propane in admixture with steam formed by the water quench of step (1).

7. The process of claim 1 wherein the temperature and flow rate of ethylene in step (2) are controlled to reduce the temperature of the resulting cooled stream to the range of 50 to 125° F.

8. The process of claim 7 wherein said temperature is reduced to the range of 90 to 110° F.

References Cited

UNITED STATES PATENTS

| | | | |
|---|---|---|---|
| 2,340,778 | 2/1944 | Steward et al. | 260—683 |
| 2,483,869 | 10/1949 | Arnold | 260—677 |
| 2,498,806 | 2/1950 | Hachmuth | 260—683 |
| 2,500,353 | 3/1950 | Gantt | 260—683 |

DELBERT E. GANTZ, Primary Examiner

C. E. SPRESSER, Assistant Examiner

U.S. Cl. X.R.

62—28; 208—100; 260—683